Jan. 20, 1970  R. L. SAGER ET AL  3,491,276
RADIO MAGNETIC INDICATOR FOR NAVIGATION
Filed April 21, 1967  2 Sheets-Sheet 1
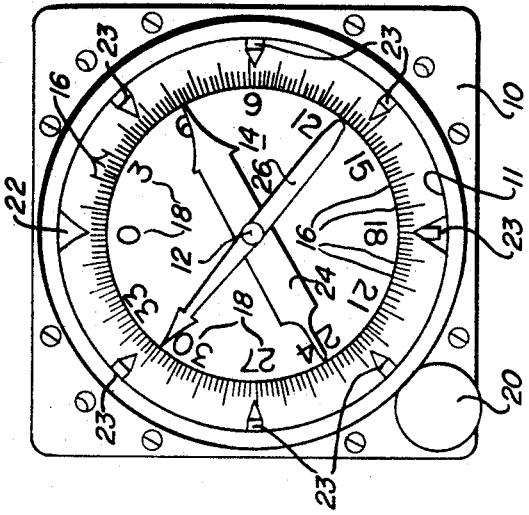
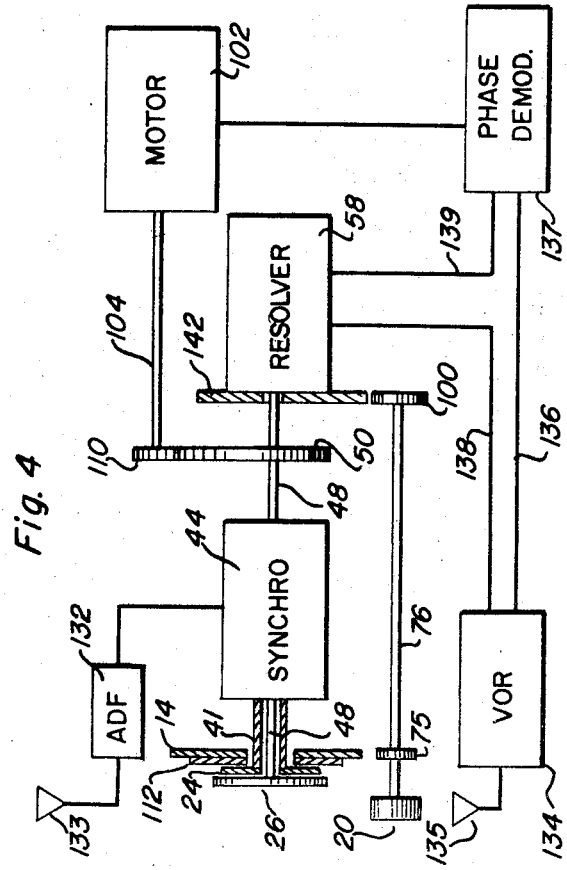
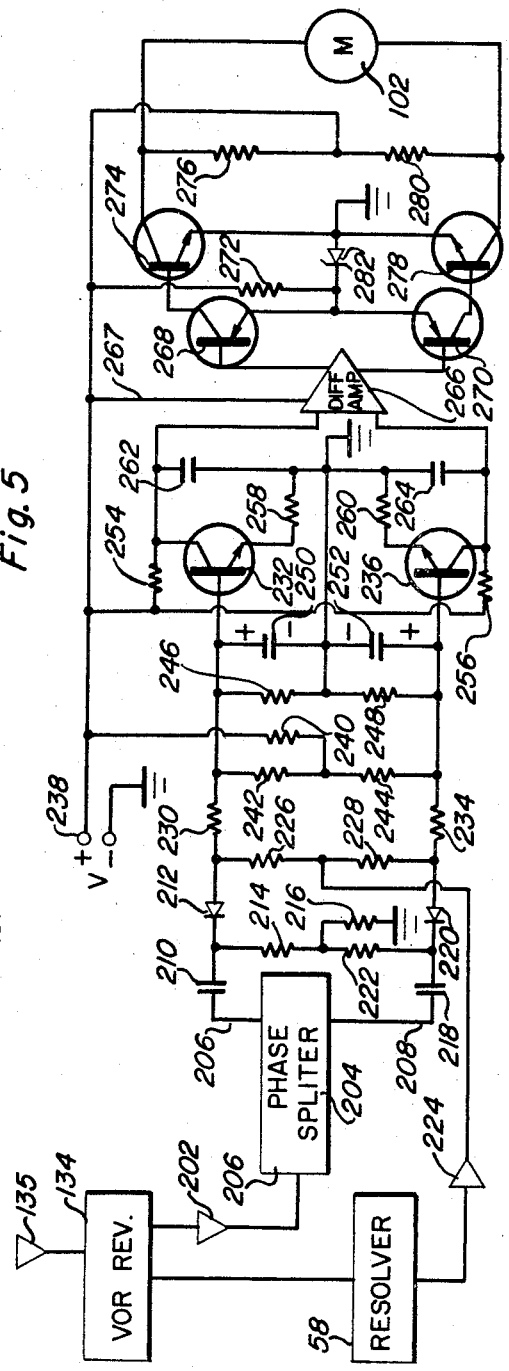
INVENTORS
RICHARD L. SAGER
PAUL J. SEEBER
BY PENDLETON, NEUMAN
SEIBOLD & WILLIAMS
ATTORNEYS

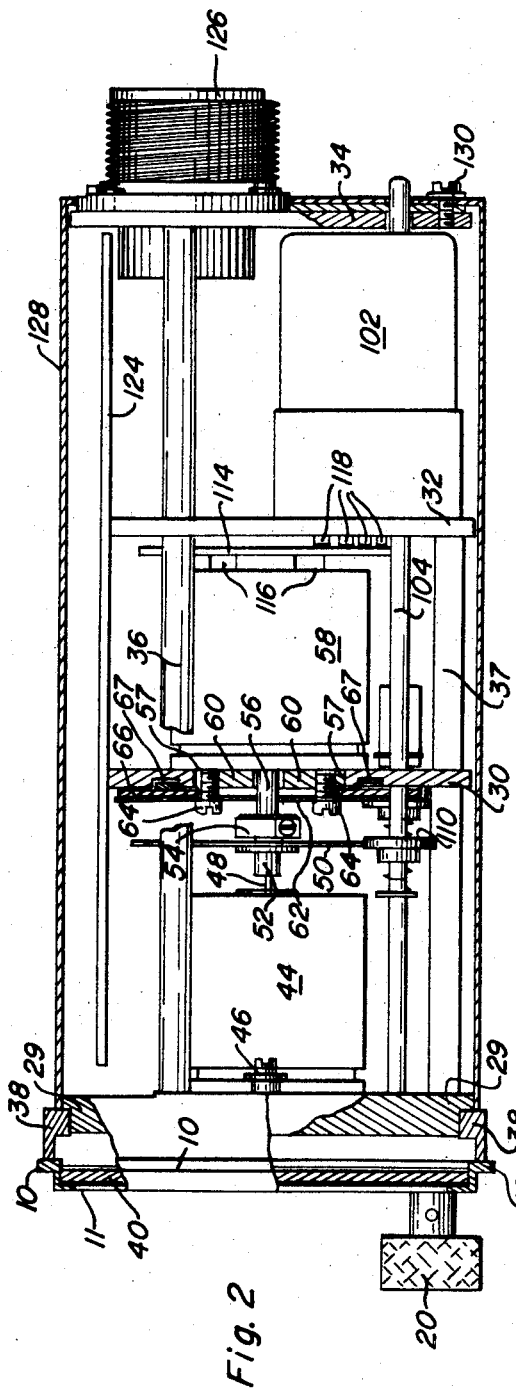

ABSTRACT OF THE DISCLOSURE

United States Patent Office
3,491,276
Patented Jan. 20, 1970

3,491,276
RADIO MAGNETIC INDICATOR FOR NAVIGATION
Richard L. Sager, Roselle, and Paul J. Seeber, Wonder Lake, Ill., assignors to Allen Aircraft Radio, Inc., Elk Grove Village, Ill., a corporation of Illinois
Filed Apr. 21, 1967, Ser. No. 632,680
Int. Cl. H02p 1/54, 5/46
U.S. Cl. 318—18                                            6 Claims

ABSTRACT OF THE DISCLOSURE

This disclosure concerns an aircraft navigation instrument for displaying the relative locations of two different radio stations broadcasting radio signals known as ADF and VOR signals, which are employed as radio aids to navigation. The instrument does not require a gyrocompass for its operation; a manual control is settable to the compass heading of the aircraft. The manual control is connected to the stator of a resolver, the rotor of which is connected to an indicator needle. The resolver is connected in circuit with one output from a VOR receiver, and the rotor of the resolver is driven by a D.C. motor responsive to the phase difference between the output of the resolver and a second output from the VOR receiver. The phase demodulator, which detects the phase difference, employs a bridge circuit and the D.C. motor is energized by a circuit in which no tapped transformers are required.

---

This invention relates to an electronic navigation system for aircraft, and especially to a phase demodulator and motor energizing circuit therefor.

There are a number of radio aids to navigation available at present, and several networks of stations transmitting signals useful in navigation are in general operation throughout much of the world. Two such systems of radio aids to navigation are known generally as the automatic direction finding system (commonly referred to as the ADF system) and the very high frequency omniranging system (commonly referred to as the VOR system).

The ADF system employs a transmitting station which transmits a steady signal at a given frequency. A rotatable directional antenna is mounted in the aircraft, and the signal induced in this antenna by the radiation of the ADF station varies as the antenna is rotated, so that the azimuth of the ADF station may be determined, relative to the longitudinal axis of the aircraft (sometimes referred to as the lubber line), simply by rotating the antenna and observing the angular position corresponding to a null or peak in the amplitude of its output. In the ADF system, the indicator needle shows the bearing from the aircraft to the ADF station relative to the line of the aircraft's flight, but not the compass bearing from the aircraft to the ADF station. The relative bearing to the ADF station is shown graphically if the lubber line on the instrument is located at the top, as viewed by the navigator. The lubber line is then in the direction of straight-ahead flight of the aircraft, and a rightward deviation of the ADF indicator needle from the lubber line indicates that the bearing to the ADF station is a number of degrees to the right of the aircraft's course equal to the angle of deviation of the indicator needle.

The VOR system is designed to produce an indication of the compass bearing between the aircraft and the VOR station, which bearing is independent of the compass heading of the aircraft. This is achieved by transmitting from the VOR transmitting station two signals, the phase difference between which is controlled, relative to the direction of transmission, to indicate the compass bearing of any such direction. For example, due north of the transmitting station the two signals are in phase. East of the station the two signals are 90° out of phase; south of the station they are 180° out of phase, and so on. The VOR system does not require any directional or rotatable antenna in the aircraft. The two signals are detected by a single antenna system and processed in a VOR receiver which produces two output signals, and the phase difference between these signals corresponds to the compass bearing from the aircraft to the VOR station. The phase difference is detected in a phase detector or the like, to derive an indication of the compass bearing between the aircraft position and the VOR station, independent of the compass heading of the aircraft.

Since the output of the VOR receiver is independent of the compass heading of the aircraft, the information derived from the VOR receiver must be modified in some manner in order to convert this information into a display of the same type as is associated with the ADF system, namely, the pointer being constrained to point graphically toward the location of the station, and indicate its bearing relative to the lubber line, In apparatus which will be described, there is provided means for accomplishing this modification without the necessity for an expensive and complicated gyrocompass.

A principal object of the present invention is to provide a relatively simple and inexpensive control circuit for effecting the aforesaid modification.

A more specific object of the present invention is to provide a phase demodulator and motor energizing circuit which is accurate and inexpensive.

Another object of the present invention is to provide such a circuit in which no tapped transformers or tapped motor windings are required.

These and other objects and advantages of the present invention will become manifest on an examination of the following description and accompanying drawings.

In one embodiment of the present invention, there is provided an aircraft navigation instrument having a rotatable compass card and two independently rotatable indicator needles all mounted for rotation about a common axis, one of said indicator needles being responsive to the output of an ADF system to simultaneously indicate the compass bearing and the relative bearing of an ADF station, the other of said needles being responsive to the output of a VOR system to simultaneously indicate the compass bearing and the relative bearing of a VOR station, said compass card being manually settable relative to an index representing the lubber line of the aircraft to indicate the compass heading of the aircraft, said ADF system including a synchro directly connected with said ADF indicator needle, said VOR system including a resolver for modifying the phase relationship of two phase modulated signals associated with said VOR system, the stator of said resolver being connected for rotation with said compass card and the rotor of said resolver being connected directly to said VOR indicator needle.

Reference will now be made to the accompanying drawings in which:

FIG. 1 is an illustration of a display of the instrument, as it appears when mounted in an instrument panel of the like;

FIG. 2 is a side elevation, partly in cross section, of an instrument incorporating the present invention;

FIG. 3 is a bottom view, partly in cross section, of the instrument illustrated in FIG. 2;

FIG. 4 is a functional block diagram of certain portions of the electrical circuitry associated with the instrument illustrated in FIGS. 1 to 3; and FIG. 5 is a schematic circuit diagram of a phase demodulator associated with the present invention, including means responsive thereto for driving the VOR indicator needle.

Referring now to FIG. 1, there is illustrated a front view of the instrument incorporating the present invention. The instrument is provided with a flange 10 for conveniently mounting the same in conjunction with the front surface of an instrument panel or the like. A circular opening 11 is provided in the center of the flange 10 to expose the moving parts of the instrument, all of which are mounted for coaxial rotation relative to a central axis 12. A rotatable compass card 14 is visible through the opening 11, and has a plurality of equally spaced marks 16, defining the various points of the compass, together with numerals 18 identifying compass positions 30° apart. The compass card as a whole including both the marks 16 and the numerals 18, is rotated by means of a knob 20, extending forwardly of the flange 10, so that the compass heading of the aircraft may be manually set into an instrument relative to an index member 22 representative of the lubber line or the longitudinal axis of the aircraft. The index member 22 is fixed relative to the flange 10. A plurality of other index members 23 are spaced about the periphery of the instrument to indicate the principal points of the compass relative to the lubber line index member 22, and are also fixed relative to the flange 10.

An ADF indicator needle 24 is mounted for rotation relative to the axis 12 for display of the relative bearing and compass bearing of an ADF station, and an indicator needle 26 is also mounted for rotation relative to the axis 12 for display of the relative bearing and compass bearing of a VOR station. The compass bearings of both stations are indicated with reference to the marks 16 and numerals 18 of the compass card, and the relative bearings are illustrated with reference to the lubber line index member 22 and the other index members 23. Thus, in the example illustrated, the aircraft is flying a compass course of about due North, and the compass card 14 has been manually set, so that the lubber line index member 22 is opposite the numeral 0 and the corresponding mark 16. The ADF station being represented in FIG. 1 is disposed at a compass bearing from the aircraft of about 62°, since the ADF indicator needle 24 points to the mark 16 corresponding to 62° on the compass card 14. The relative bearing of the ADF station is about 60° clockwise from the compass heading of the aircraft, as indicated by the indicator needle 24 relative to the lubber line index member 22 and the other index members 23.

The VOR indicator needle 26 similarly indicates the compass bearing and the relative bearing of a VOR station.

If the aircraft in which the instrument illustrated in FIG. 1 is mounted, continues to fly a straight course with a bearing of due North, the two indicator needles 24 and 26 then indicate the passage of the two stations relative to the aircraft by a steady downward rotation, always pointing to the correct compass bearings and relative bearings of the two stations. The information thus displayed on this one instrument can be omployed to find the exact position of the aircraft on a printed chart at any given time, by means of triangulation, based on the known positions of the ADF and VOR stations being represented by the indicator needles 24 and 26.

If the aircraft assumes a different compass course, the new compass heading is set into the instrument by means of the knob 20, whereby the compass card 14 is rotated until the compass heading is opposite the lubber line index member 22, and the new compass bearings and relative bearings of the ADF and VOR stations are automatically displayed.

Referring now to FIGS. 2 and 3, two views of the construction of the instrument are illustrated. The instrument is constructed in association with a frame having a front plate 29, a forward plate 30, a central plate 32, and a rear plate 34, held in fixed relation with each other by means of two side posts 36 and a bottom post 37 secured to each of the plates. The plates 29, 30, 32 and 34 are in spaced parallel relationship, and serve to support the various elements of the instrument.

On the front plate 29 is mounted the instrument display mechanism, including a bezel 38. The bezel 38 supports the flange member 10, and a glass window 40 is held in position by the flange member 10 and closes the central opening 11.

The two indicator needles 24 and 26 are illustrated in FIG. 3. The needle 24 is driven by a relatively large shaft 41 which protrudes through an opening in the plate 29. This shaft is connected to the rotor of a synchro 44, the stator of which is clamped securely to the plate 29 by means of clamps 46.

The shaft 41 is hollow and a smaller diameter shaft 48 is connected to the VOR indicator needle 26. The shaft 48 runs through the entire length of the shaft 41 and energes at the rear end of the synchro 44 (FIG. 2). There it is connected to a gear 50 by means of a hub 52. The hub 52 is also connected by means of a clamp 54 to a shaft 56 passing through the forward plate 30. This shaft is connected to the rotor of a resolver 58.

An aperture 57 in the forward plate 30 is circular and coaxial with the shafts 48 and 56. A circular boss 60 is rotatably mounted in the aperture 57, and is connected between the front face of the stator housing of the resolver 58 and a gear 62 by means of screws 64 extending into the front portion of the housing of the resolver 58. The thickness of the boss 60 is chosen to permit the assembly of the resolver stator and the gear 62 to freely rotate within the aperture 57. A Teflon washer 66 is disposed between the gear 62 and the surface of the forward plate 30, and a spring washer 67 is disposed in annular groove in the surface of the forward plate 30 facing the Teflon washer 66, to assure alignment of the assembly by urging the gear 62 and washer 66 away from the forward plate 30.

The relatively heavy shaft 56 supports the gear 50 with its associated hub and clamp, so that the thin shaft 48 need only support the VOR indicator needle 26. The interior of the hollow shaft 41 serves as a bearing for the shaft 48.

The compass card 14 is connected by rivets 68 to a spacer washer 69 mounted for rotation on a hub 70 secured to the hollow shaft 41, and to a gear 71 coaxial therewith. A retaining plate 72, secured to the bezel 38 is provided with a circular opening for receiving the spacer washer 69, with the compass card 14 in front of the plate 72 and the gear 71 behind it. An annular spring washer 73, disposed in an annular groove 74 in the front of the front plate 29, urges the gear 71 against the plate 72.

The gear 71 is in mesh with an idler gear 75 mounted on a shaft 76, mounted for rotation in the front plate 29.

The idler gear 75 is also in mesh with a gear 77 carried by a shaft 78 extending forwardly out of the bezel 38 and supporting the knob 20. The compass card 14 may be set by the manual rotation of the knob 20, which turns the compass card 14 via the shaft 78 and the gears 76 and 75.

The shaft 76 extends rearwardly from the forward plate 29, and terminates within a hollow connector 82 mounted on a push shaft 84 by means of a pin 86. The end of the shaft 76 is splined, and corresponding splines are provided within the interior of the connector 82 so that the shaft 76 and the shaft 84 rotate together.

A ring 88 is mounted on the periphery of the connector 82 slightly rearwardly of the forward plate 30, for a purpose which will be described hereinafter. An aperture 90 in the forward plate 30 receives the forward part of the connector 82, and serves as a bearing surface for supporting the connector 82 for sliding or reciprocating movement.

The forward end of the connector 82 terminates in a flange 92. The flange 92 is slightly larger than the aperture 90, so that the connector 82 is prevented from being moved out of association with the aperture 90. A Teflon washer 94 is interposed between the flange 92 and the forward surface of the forward plate 30.

A ring 96 is mounted in a fixed position on the shaft 76 and a compression spring 98 is coiled about the shaft 71 between the ring 96 and a gear 100 supported on the shaft 76. The connection between the shaft 76 and the gear 100 is splined, the splines of the gear 100 cooperating with the splines of the shaft 76 so that the gear 100 normally rotates therewith. The spring 98 urges the gear 100 rearwardly relative to the shaft 76, and in its rearmost position, as illustrated in FIG. 3, it is in engagement with the gear 62.

The push rod 84 extends rearwardly, slightly beyond the rear plate 34, and serves to permit the connection between the gears 100 and 62 to be selectively disconnected. When the push rod 84 is urged forwardly, the push rod 84 and the connector 82 move forwardly until the ring 88 on the connector 82 engages the rear surface of the forward plate 30. The flange 92 pushes the gear 100 forward, sliding along the splines of the shaft 76 and out of engagement with the gear 62. By this means, the angular position of the compass card 14 may be adjusted relative to that of the stator of the resolver 58, without the necessity for any electrical circuitry or any need for opening up the instrument while this adjustment is being made.

A motor 102 is mounted on the center plate 32 of the instrument, by means not shown, and a shaft 104 of the motor 102 projects through an aperture 106 in the center plate 32 and through a bearing 108 located in an aperture in the forward plate 30 (FIG. 3). A gear 110 is fixed on the end of the shaft 104 by means of a pin 112. The gear 110 is in engagement with the gear 50 and permits simultaneous rotation of the VOR indicator needle 26 and the rotor of the resolver 58, in response to the motor 102.

A plate 114 is secured to the rear end of the resolver 58 by means of brackets 116, and is adapted for rotation with the resolver stator. On the rear surface of the plate 114, there is provided a plurality of concentric annular slip rings (not shown), which are connected to the windings within the rotor and stator of the resolver 58.

A plurality of brushes 118 are mounted on the center plate 32 and are electrically connected to a plurality of terminals 120 (two of which are shown in FIG. 3) supported by a terminal block 122 secured to the center plate 32, whereby electrical connections may be made to the resolver 58 although both the rotor and stator of the resolver 58 are rotatable.

A board 124 is supported on the upper ends of the plates 29, 30, 32, and 34, and the various electronic components of the phase demodulator are mounted on this board. A connector 126 is provided at the rear of the instrument, mounted on the plate 34, by which electrical connections may be made from the circuit board 124 and the terminals 120 to other apparatus without the instrument. Connection is also made between the circuit board 124, and a potentiometer 127 mounted at the rear of the unit for selective adjustment when necessary. The entire assembly is surrounded by a dust cover 128, tightly fitting with the front plate 29 and secured to the rear plate 34 by means of screws 130.

The operation of the apparatus of FIGS. 2 to 3 can best be understood by reference to FIG. 4, which is a schematic illustration of the entire system, partly in cross section and partly in functional block form. An ADF receiver 132 is connected with a directional antenna 133 and furnishes an input to the ADF synchro 44. The synchro 44 is connected by means of the hollow shaft 41 with the ADF indicator needle 24 which is disposed on the front side of the compass card 14.

A VOR receiver 134 is connected to its own antenna 135 and furnishes at its two outputs two signals having a phase difference responsive to the compass bearing between the VOR station and the aircraft. One of the outputs is connected directly via line 136 to a phase demodulator 137 while the other is connected through the resolver 58 and to the phase demodulator 137 via lines 138 and 139. The demodulator 137 develops a D.C. voltage proportional to a function of the phase difference between its two inputs, which voltage is applied to the motor 102. The motor 102 is connected by means of the shaft 104 to the gear 110 in mesh with the gear 50 fixed on the shaft 48 of the rotor of the resolver 58. The shaft 48 passes through the hollow shaft 41, and drives the VOR indicator needle 26 in front of the ADF needle 24.

The manual control knob 20 is connected to indirectly rotate the gear 75, the shaft 76, and the gear 100 to simultaneously rotate the compass card 14 and the stator of the resolver 58.

If the aircraft is heading directly towards the VOR station and the compass card 14 is set relative to the lubber line index member 22 (FIG. 1), and the VOR needle 26 is correctly pointing to the index member 22, the phase shift induced by the resolver 58 is such as to make the two inputs to the demodulator 137, 90° apart. Under these circumstances no voltage is applied to the motor 102, and the VOR needle 26 does not change its position.

If now the aircraft is turned to a new compass heading and the compass card 14 is set accordingly by means of the knob 20, the stator of the resolver 58 is rotated by the number of degrees by which the heading of the aircraft has been changed, and produces a corresponding additional phase shift in its output. The phase demodulator 137 produces a D.C. voltage proportional to the shift in phase. This voltage is applied to the motor 102, which rotates the rotor of the resolver 58 via gears 110 and 50 and shafts 104 and 48. The resolver rotor is thereby rotated in such a direction as to bring the phase difference between the two signals furnished to the demodulator 137 back to 90°. In the course of rotating the rotor of the resolver 58, the VOR indicator needle 26 is also rotated, and graphically points to the relative bearing of the VOR station, as well as to its compass bearing.

The resolver rotor is controlled very rapidly by the motor 102 in response to any deviation from 90° phase difference between the two inputs to the demodulator 137, so that the visual display of the instrument changes virtually instantaneously with changes in either the compass card position or the relative bearing between the aircraft and the VOR station.

Referring now to FIG. 5, a schematic diagram of the circuit involved in the phase demodulator 137 and the control of the motor 102 are illustrated, together with the other system components with which they cooperate. As noted above, the two inputs of phase demodulator 137 are derived from the receiver 134 and the resolver 58. The output from the receiver 134 is amplified in an amplifier 202 and connected to the input of a phase splitter 204. The phase splitter 204 is conventional and is adapted to produce a pair of signals at its two outputs 206 and 208 which are 180° out of phase. For convenience, hereinafter, the output of the phase splitter on line 206 will be referred to as the first output, and the output appearing on line 208 will be referred to as the second output. The first output is connected through a capacitor 210 to the cathode of a diode 212 and also to one end of a resistor 214, the other end of the resistor 214 being connected to ground through a resistor 216. The second output is connected through a capacitor 218 to the cathode of a diode 220 and also to one end of a resistor 222, the other end of the resistor 222 being connected to the junction of resistors 214 and 216.

The output from the resolver 58 is amplified in an amplifier 224 and connected to the anodes of the two diodes 212 and 220 by resistors 226 and 228, respectively.

The anode of the diode 212 is connected by a resistor 230 to the base of a transistor 232, while the anode of the diode 220 is connected by a resistor 234 to the base of a transistor 236. A source of positive voltage is connected from a terminal 238 through a resistor 240 and thence to the bases of the transistors 232 and 236 via resistors 242 and 244, respectively. The bases of the transistors 232 and 236 are also both connected to ground through resistors 246 and 248, respectively. A capacitor 250 is connected in parallel with a resistor 246 and a capacitor 252 is connected in parallel with a resistor 248.

The collectors of both of the transistors 232 and 236 are connected to the terminal 238 by resistors 254 and 256, respectively, and their emitters are both connected to ground by resistors 258 and 260, respectively. Their collectors are also connected to ground through capacitors 262 and 264, respectively, and to the two inputs of a differential amplifier 266. The differential amplifier 266 is connected to the terminal 238 by a line 267, by which the amplifier 266 is powered. The outputs of the differential amplifier 266 are respectively connected to the bases of two transistors 268 and 270, the emitters of which are both connected together and are connected to the terminal 238 through a resistor 272.

The collector of the transistor 268 is connected to the base of a transistor 274, the emitter of which is grounded and the collector of which is connected to the terminal 238 by a resistor 276. The collector of the transistor 270 is connected to the emitter of the transistor 268 and the collector of the transistor 270 is connected to the base of a transistor 278, the emitter of which is grounded. The collector of the transistor 278 is connected to the terminal 238 by a resistor 280. The motor 102, which drives the resolver rotor and the VOR indicator needle, is connected between the collectors of the two transistors 274 and 278.

The emitters of the transistors 268 and 270 are maintained at a fixed positive voltage relative to ground by a Zener diode 282 connected between the emitters and ground.

During the operation of the circuit of FIG. 5, the positive voltage available at the terminal 238 charges both of the capacitors 250 and 252, in the polarity indicated, through the resistors 240, 242 and 244. A bridge circuit including the diodes 212 and 220 is connected in circuit with the capacitors 250 and 252, and operates to modify the amount of charge accumulated on these two capacitors in accordance with the phase of the two input signals amplified by amplifiers 202 and 224. When the diode 212 is forward biased, it tends to discharge the capacitor 250, and when the diode 220 is forward biased, it tends to discharge the capacitor 252. The bridge circuit determines which of the diodes 212 or 220 is to be forward biased at any instant, in accordance with the phase of the input signals.

As the first and second outputs of the phase splitter 204 are 180° out of phase, opposite phase voltages appear across resistors 214 and 222. The input from the resolver 58 is connected to the junction of the resistors 226 and 228, and produces a voltage proportional to the input from the resolver between this junction and ground. The resolver voltage is thus connected in series with the resistor 214 and the diode 212, and also in series with the resistor 222 and the diode 220. As the voltages across the resistors 214 and 222 are opposite in phase, a voltage equivalent to the sum of the two input signals is applied across one of the diodes while a voltage equivalent to the difference between two input signals is applied across the other.

If the signal at the first output of the phase splitter 204 is in phase with the signal from the amplifier 224, the signal applied to the diode 212 is the difference between the two input signals and that applied to the diode 220 is the sum thereof. The two amplifiers 202 and 224 are such as to produce the two input signals of equal amplitude so that the difference between two input signals applied across the diode 212 is essentially zero. The potentiometer 127 (FIG. 3) is included in the circuit of one of the amplifiers 202 and 224, to insure that the amplitudes of the two input signals are equal. Therefore, the diode 212 is unblocked and discharges its capacitor 250 through resistors 214 and 216. The sum of the two input voltages, however, which is applied across the diode 220, is positive for half a cycle and negative for half a cycle, and the diode 220 is reverse biased and therefore cut off during alternate half cycles of the input signals, so that the capacitor 252 is discharged less rapidly than the capacitor 250.

A similar analysis reveals that if the two input signals are 180° out of phase, the operation is the same as that described above, except that the functions of the diodes 212 and 220 are interchanged, and the capacitor 250 is discharged less rapidly. If the input signals are 90° out of phase, the two diodes 212 and 220 conduct about equally, and the voltages across the capacitors 250 and 252 are equal. For other conditions of phase difference between the two input signals, the voltages appearing across the capacitors 250 and 252 are more or less unbalanced, depending on the degree of phase difference between the two input signals.

When the phase difference between the two input signals is 270° apart, the capacitors 250 and 252 are balanced, just as they are when the phase difference is 90°. However, the balanced condition with a 270° phase difference is unstable, for any deviation from 270° tends to produce a D.C. voltage causing the motor 102 to deviate further from 270°. Eventually, the deviation increases until the stable 90° condition is reached. The only stable condition in which the voltage across the capacitors 250 and 252 is balanced is when the two input signals to the phase demodulator differ by precisely 90°.

The voltage appearing across the capacitor 250 is amplified by a D.C. amplifier comprising the transistor 232 connected in a common emitter configuration. The output of this amplifier appears across the capacitor 262. Simultaneously, the voltage across the capacitor 252 is amplified in a D.C. amplifier including the transistor 236, the output of which appears across the capacitor 264.

The capacitors 262 and 264 are connected in series, with the common terminal being grounded. The ungrounded terminals of the capacitors 262 and 264 are connected to the inputs of a differential amplifier 266, which operates to amplify the difference in the voltages across the capacitors 262 and 264.

The output of the differential amplifier 266 is amplified in further D.C. amplifiers including transistors 268, 270, 274 and 278. The amplified outputs appear at the collectors of the transistors 274 and 278, and are connected to opposite terminals of the motor 102. Accordingly, the motor 102 is energized for rotation in either direction depending on the sign of the differential between the voltages appearing at the collectors of the transistors 274 and 278, which is proportional to the difference in voltages across the capacitors 250 and 252. If the difference is zero (as when the input phase differential is 90°), no voltage differential is applied to the motor 102.

The circuit of FIG. 5 achieves the desirable result of permitting the motor 102 to be controlled without the need for relatively expensive center-tapped transformers. The circuit of FIG. 5 also makes it possible to achieve highly accurate results, for all of the amplifiers interconnected between the bridge circuit including the diodes 212 and 220 are D.C. amplifiers, which are capable of responding to very slowly changing conditions of phase difference, such as are encountered, for example, when the aircraft's heading is slightly displaced from a distant VOR station.

In one exemplary embodiment of the present invention, the following values are employed for the components in one half of the diagram illustrated in FIG. 5, it being understood that the other half of the circuit is the mirror image of the first half, and therefore employs components having the identical values of those listed.

| | | |
|---|---|---|
| 210 | mfd | 1.8 |
| 214 | Kohms | 4.7 |
| 216 | do | 27 |
| 226 | do | 10 |
| 230 | do | 10 |
| 240 | do | 22 |
| 242 | do | 82 |
| 246 | do | 10 |
| 250 | mfd | 10 |
| 254 | Kohms | 47 |
| 256 | do | 1 |
| 262 | mfd | 1.8 |
| 272 | ohms | 82 |
| 276 | do | 100 |

The Zener diode 282 preferably has a Zener voltage of 8.15 volts, and the differential amplifier 266 is preferably a commercially available integrated circuit such as Model No. CA3000, manufactured by Radio Corporation of America.

From the foregoing, an exemplary embodiment of the present invention has been described with such particularity as to enable others skilled in the art to make and use the same, and, by applying current knowledge, to adapt the same for use under varying conditions of service, without departing from the essential features of novelty thereof, which are intended to be defined and secured by the appended claims.

What is claimed is:

1. In an aircraft-borne navigation instrument having a rotatable compass card, an indicator needle mounted for rotation coaxial with said compass card, a source of an A.C. signal and a resolver, said resolver being mechanically connected between said indicator needle and said compass card and electrically connected to said source for producing a phase shift in said signal in response to deviation in the relative angular positions of said compass card and said indiactor needle from a predetermined positional relation; the combination comprising a phase demodulator for deriving a signal responsive to said phase shift, and a motor responsive to said phase demoudlator for driving said indicator needle, said phase demodulator comprising a bridge electrically connected to said resolver and to said source for deriving a differential output in response to said phase shift, and means for amplifying said differential output, said motor being connected directly to the output of said amplifying means.

2. In an aircraft-borne navigation instrument having a rotatable compass card, an indicator needle mounted for rotation coaxial with said compass card, and a resolver mechanically connected between said indicator needle and said compass card for producing a phase shift in an electrical signal in response to deviation in the relative angular positions of said compass card and said indicator needle from a predetermined positional relation, the combination comprising a phase demodulator for deriving a signal responsive to said phase shift, and a [D.C.] motor responsive to said phase demodulator for driving said indicator needle, said phase demodulator comprising a bridge connected to said resolver and to a source of a standard phase signal for deriving a differential output in response to said phase shift and means for amplifying said differential output, said motor being connected directly to the output of said amplifying means said bridge including a voltage source, first and second capacitors each having one terminal connected to a reference potential, charging means connected to said voltage source for charging both of said capacitors from said source, and discharge means for differentially discharging said capacitors in response to said phase shift.

3. Apparatus according to claim 2, wherein said discharge means comprises a first diode connected between said first capacitor and said standard phase source, a second diode connected between said second capacitor and said standard phase source, and means connecting the electrical signal from said resolver with both of said diodes to differentially bias them in accordance with the phase difference between said standard phase signal and the signal from said resolver.

4. Apparatus according to claim 3, including a first resistor connected between said first diode and said first capacitor, a second resistor connected between said second diode and said second capacitor, a phase splitter connected to said standard phase source for providing first and second inverse outputs responsive to said standard phase signal, said first output being connected to said first diode through a third capacitor and said second output being connected to said second diode through a fourth capacitor, resistance means connecting the junction of said first diode and said first output to said reference potential, resistance means connecting the junction of said second diode and said second output to said reference potential, resistance means connecting the junction between said first diode and said first resistor to said resolver, and resistance means connecting the junction between said second diode and said second resistor to said resolver.

5. Apparatus according to claim 1, wherein said differential output is produced between first and second output terminals, neither of which is maintained at a reference potential, and said amplifying means comprises a first amplifier directly coupled to said first output terminal for amplifying a signal produced at said first output terminal relative to said reference potential, a second amplifier directly coupled to said second output terminal for amplifying a signal produced at said second output terminal relative to said reference potential.

6. Apparatus according to claim 5, including a voltage source, and wherein said first amplifier comprises a first direct coupled transistor amplifier connected in common emitter configuration, with its collector connected to said voltage source through a first resistance, said second amplifier comprises a second direct coupled transistor amplifier connected in common emitter configuration with its collector connected to said voltage source through a second resistance, and said motor has two terminals which are connected directly to the collectors of said first and second transistors, respectively.

References Cited

UNITED STATES PATENTS

| | | | |
|---|---|---|---|
| 2,529,510 | 11/1950 | Manley | 318—28 XR |
| 2,632,135 | 3/1953 | Carpenter | 318—16 |
| 2,866,930 | 12/1958 | Russell | 318—16 |
| 3,135,900 | 6/1964 | Smith | 318—28 |

B. DOBECK, Primary Examiner

U.S. Cl. X.R.

318—28

PO-1050
(5/69)

UNITED STATES PATENT OFFICE
CERTIFICATE OF CORRECTION

Patent No. 3,491,276            Dated January 20, 1970

Inventor(s) Richard L. Sager ; Paul J. Seeber

It is certified that error appears in the above-identified patent and that said Letters Patent are hereby corrected as shown below:

Column 2, line 62, "of" should be -- or --

Column 4, line 36, before "annular" insert -- an --

Column 5, line 67, "Figs. 2 to 3" should be -- Figs. 1 to

Column 9, line 50, "demoudlator" should be -- demodulator

Column 9, line 66, "[D.C.]" should be deleted.

SIGNED AND
SEALED
JUN 23 1970

(SEAL)
Attest:

Edward M. Fletcher, Jr.
Attesting Officer

WILLIAM E. SCHUYLER, JR.
Commissioner of Patents